United States Patent [19]

Watson et al.

[11] 4,113,806

[45] Sep. 12, 1978

[54] POLYPROPYLENE IMPACT BLENDS HAVING IMPROVED OPTICAL PROPERTIES

[75] Inventors: Albert T. Watson, Washington, W. Va.; Robert L. Hull, Minooka, Ill.

[73] Assignee: Exxon Research & Engineering Co., Linden, N.J.

[21] Appl. No.: 718,846

[22] Filed: Aug. 30, 1976

[51] Int. Cl.$^2$ ............................................. C08L 23/16
[52] U.S. Cl. ................................................. 260/897 A
[58] Field of Search .................................... 260/897 A

[56] References Cited

U.S. PATENT DOCUMENTS

| | | | |
|---|---|---|---|
| 3,256,367 | 6/1966 | Jayne | 260/897 |
| 3,515,775 | 6/1970 | Combs et al. | 260/897 |
| 3,957,919 | 5/1976 | Von Boduncen et al. | 260/897 A |

Primary Examiner—Carman J. Seccuro
Attorney, Agent, or Firm—B. C. Cadenhead; Myron B. Kurtzman

[57] ABSTRACT

A polypropylene impact blend having a good overall balance of mechanical properties, particularly high impact strength, and surprisingly high clarity is disclosed which includes about 70 to about 90% by weight of a polypropylene, about 1 to about 18% by weight of a low density polyethylene and about 2 to about 24% by weight of an amorphous ethylene-propylene copolymer elastomer, with or without a non-conjugated diene, having a high combined ethylene content. The polypropylene impact blends are useful for making molded or extruded shaped articles and the like which are essentially clear.

7 Claims, No Drawings

POLYPROPYLENE IMPACT BLENDS HAVING IMPROVED OPTICAL PROPERTIES

BACKGROUND OF THE INVENTION

1. Field of the Invention

This invention relates to polypropylene compositions and more particularly pertains to a novel polypropylene impact blend having good mechanical properties along with significantly improved optical properties.

2. Description of the Prior Art

Polypropylene impact blends comprised of polypropylene modified by the addition of certain types of amorphous ethylene-propylene copolymer elastomers and certain types of polyethylenes are well-known in the art. As known the addition of certain types of these polymeric components in minor amounts to polypropylene results in polypropylene impact blends having good overall mechanical property balances, particularly improved impact strengths, as compared to unmodified polypropylenes. Such polypropylene impact blends are thus particularly useful in the manufacture of molded and extruded shaped articles, such as containers, filament rods, and the like, in accordance with conventional molding and/or extrusion techniques.

By way of example, U.S. Pat. No. 3,256,367 discloses a modified polypropylene impact blend having improved impact strength, stiffness and heat resistance properties as compared to unmodified polypropylene or other known polypropylene blends modified with minor amounts of rubber products, such as the above-mentioned ethylene-propylene copolymer elastomers, polyisobutylene, and the like. As described in the patent, the blends are comprised of 50 to 96% by weight polypropylene, 2 to 25% by weight of certain polyethylenes, particularly high density polyethylenes, as exemplified, and 2 to 25% by weight of certain types of amorphous ethylene/propylene copolymer or polyisobutylene elastomers.

Notwithstanding the overall improvements which have been obtained by the incorporation of such additives, such improvements have been achieved at the expense of producing polypropylene impact blends having extremely poor optical properties. More specifically, such blends are essentially opaque and, accordingly, cannot be employed in the manufacture of products requiring clarity.

U.S. Pat. No. 3,515,775 discloses a polypropylene blend of certain types of polypropylene, high density crystalline polyethylene and an amorphous ethylene-propylene copolymer which has relatively high optical properties for the manufacture of clear films and sheets. However, the types of polymer components employed respectively have relatively low molecular weights and, as disclosed, are useful only in the manufacture of such films and sheets.

So far as is presently known, no one has previously produced a polypropylene impact blend having both good mechanical properties, particularly high impact strength, stiffness, heat distortion resistance, etc., along with acceptable optical properties for use in the manufacture of high clarity articles in accordance with conventional injection molding, blow molding, and/or extrusion techniques.

SUMMARY OF THE INVENTION

The present invention is based upon the discovery that a polypropylene impact blend having surprisingly improved optical properties and a good balance of overall mechanical properties is provided by certain specific combinations of a low density polyethylene and an ethylene-propylene copolymer elastomer having a high combined ethylene content with a polypropylene. Unexpectedly, the low density polyethylene, i.e., having a density of no more than 0.929 g/cc, in combination with an amorphous ethylene-propylene copolymer elastomer having a combined ethylene content of at least about 50 wt.%, exert a synergistic effect with the polypropylene resulting in a polypropylene impact blend which is significantly clearer than the conventional polypropylene impact blends modified by the addition of an elastomer and/or a high density polyethylene. This synergism allows the achievement of such improved optical characteristics while retaining a significant portion of the desirable overall mechanical property characteristics normally obtained by the modification of polypropylene with an elastomer and/or a high density polyethylene.

DETAILED DESCRIPTION OF THE INVENTION

More particularly, the polypropylene impact blends of the invention are principally composed of from about 70% by weight to about 95% by weight of a polypropylene, from about 1% by weight to about 18% by weight of a low density polyethylene, having a density of no more than 0.929 g/cc, and from about 2% by weight to about 24% by weight of an amorphous ethylene-propylene copolymer elastomer, with or without a copolymerizable polyene, having an ethylene content of at least 50 wt.%, based upon the weight of the elastomer. The preferred blends are comprised of from about 75 to about 90 wt.% polypropylene, about 3 to about 10 wt.% low density polyethylene and about 7 to about 15 wt.% of the ethylene-propylene copolymer elastomer.

These indicated component amounts should be reasonably observed in order to provide blends having good mechanical property characteristics, such as high impact strength, stiffness, heat distortion resistance and the like. Furthermore, the weight ratio of the elastomer to low density polyethylene components in the blends of the invention is preferably within the range of from about 1:1 to about 2:1 elastomer:low density polyethylene.

Any polypropylene conventionally employed in preparing polypropylene impact blends having a melt flow rate (MFR) of from about 0.5 to about 30 g/10 min. (230° C., 2160 g load) can be used in the blends of this invention. However, we prefer to employ normally solid isotactic polypropylenes, i.e., polypropylenes of greater than 90% hot heptane insolubles, having a melt flow rate within the range of from about 1.0 to about 20. The particular density of the polypropylene is not critical. Preferred isotactic polypropylenes are normally crystalline and have densities ranging from about 0.89 to about 0.91 g/cc. Moreover, the blends of the invention can include several polypropylenes having different melt flow rates to provide a polypropylene impact blend having mechanical property characteristics as desired.

As previously indicated, it is essential to employ a low density polyethylene, i.e., a polyethylene having a density of no more than about 0.929 g/cc, in the blend of the present invention in order to obtain a good balance of mechanical properties and clarity. Surprisingly, the low density polyethylene, in combination with the high combined ethylene content elastomer described more particularly below, compatibilizes the mixture of elastomer, polyethylene and polyproylene resulting in good clarity. Yet, the achievement of such improved clarity results without a great lowering of impact strength as compared to conventional polypropylene impact blends containing high density polyethylenes referred to above.

Accordingly, low density polyethylenes useful in the compositions of the invention include those having a density of from about 0.915 to no more than 0.929 g/cc, preferably about 0.915 to about 0.924 g/cc, and a melt index within the range of from about 0.5 to about 50 g/10 min. (190° C., 2160 g load), preferably from about 2 to about 30. Such low density polyethylenes are well-known in the art and readily available commercially. Moreover, the methods of manufacturing low density polyethylenes are well-known and, therefore, a detailed description of such methods will not be made.

The ethylene-propylene copolymer elastomers useful for the blends of this invention are amorphous random elastomeric copolymers of ethylene and propylene, with or without a copolymerizable polyene which have a viscosity average molecular weight of about 100,000 to about 250,000, preferably about 100,000 to about 200,000, Mooney viscosity within the range of about 40 to about 120 (ML 1+8' at 212° F.), preferably about 70 to about 100, and a combined ethylene content of at least 50 wt.% to about 90 wt.%, preferably about 60 wt.% to about 80 wt%. As previously indicated, such higher combined ethylene content elastomers in combination with a low density polyethylene have been found to exert a synergistic effect in admixture with polypropylene resulting in polypropylene blends with significantly improved clarity, a good stiffness-impact strength balance, and relatively good tensile strength, heat distortion resistance, and the like.

Examples of ethylene-propylene elastomers (EPR) which are particularly useful in the invention include saturated ethylene-propylene binary copolymer rubbers (EPM) and ethylene-propylene-non-conjugated diene terpolymer rubbers containing about 1 to about 5 wt.% diene, such as 5-ethylidene-2-norborene, 5-methylene-2-norborene, 1,4-hexadiene, etc. (EPDM), having the above-mentioned characteristics. These relatively high ethylene-containing elastomers and the methods for making same are well-known and are readily available commercially and, accordingly, will not be discussed more particularly in detail.

The impact polypropylene blends of the invention can be prepared by mixing the elastomer, low density polyethylene and polypropylene components in any order using conventional hot processing equipment well-known in the art, such as a Banbury mixer, a roll mill, a screw extruder, and the like. We prefer to employ a masterbatch technique wherein the elastomer and low density polyethylene components are initially intimately mixed with a minor portion of the polyproylene and then this masterbatch blend is let down into homopolymer polypropylene. By way of example, a masterbatch blend can first be prepared by mixing 40 wt.% elastomer, 40 wt.% low density polyethylene and 20 wt.% polypropylene in a Banbury mixer at a temperature of about 340° F. to about 390° F. for about 2 to about 5 minutes to ensure intimate dispersion of components. This masterbatch blend can then be let down into homopolymer polypropylene at a weight ratio of 3:1, such as by blending in a Banbury mixer, to provide a polypropylene impact blend comprised of 80 wt.% polypropylene, 10 wt.% EPR and 10 wt.% low density polyethylene.

The polypropylene impact blends of this invention may also include antioxidants, stabilizers, antifogging agents, processing agents and other additives, if desired, in normal and conventional amounts. Moreover, the blends can include pigments, fillers, and colorants in conventional amounts for producing products not requiring clarity.

The impact blends of the invention are particularly useful in producing molded and/or extruded parts of surprisingly high clarity by employing of conventional injection molding, blow molding and/or extrusion techniques. More particularly, the preferred blends have extremely good melt flow rheologies for use in blow and injection molding techniques.

EXAMPLES

The following examples more particularly illustrate the nature of the invention but are not intended to be limitative thereof. In the following example, the mechanical evaluations were made employing the following tests:

| TEST FOR | VIA | ASTM |
| --- | --- | --- |
| Stiffness | Flexural Modulus | D 790 I.A. |
| Impact Strength | Notched at Room Temp. and Unnotched at 0° F., −20° F., and −40° F. | D 256, Method A |

Test specimens for the above mechanical property evaluations were produced on a HPM injection molding machine, 350 tons capacity, Egan 2 inches Reciproscrew feed. Furthermore, unless specified otherwise, the blends in the example were prepared in a Banbury Model BR (2 lbs.) mixer.

Several concentrate or masterbatch blends were prepared using 40 wt.% low density polyethylene having a density of 0.924 and a melt index of 30 (LD-610, Exxon Chemical Company U.S.A.), 20 wt.% polypropylene having a melt flow rate of 12 (E-117, Exxon Chemical Company U.S.A.) and 40 wt.% of the following ethylene-propylene copolymer rubbers:

| Sample No. | | Mooney (ML 1+8 at 212° F.) |
| --- | --- | --- |
| 1 | 40 wt. % ethylene | 40 |
| 2 | 48 wt. % ethylene | 90 |
| 3 | 64 wt. % ethylene | 40 |
| 4 | 87 wt. % ethylene | 40 |
| 5 | 100 wt. % ethylene | 75 |

1 VISTALON ®404, Exxon Chemical Company U.S.A.
2 VISTALON ®606, Exxon Chemical Company U.S.A.
3 VISTALON ®707, Exxon Chemical Company U.S.A.
4 MD-476, Exxon Chemical Company U.S.A.
5 High density polyethylene, AA60-003, Allied Chemical Company, density 0.960; MI 0.3.

Each of the concentrates were then let-down into polypropylene (E-115, Exxon Chemical Company U.S.A., 5 MFR) to provide sample blends containing 8.9% elastomer and 8.9% low density polyethylene. The physical properties of the samples prepared were as follows:

| Sample No.[1] | Notch Rt | Izod Immpact Unnotched 0° | -20° | -40° | Flex.Mod. |
| --- | --- | --- | --- | --- | --- |
| 1 | 1.6 | 11.9 | 9.2 | 7.8 | 123 M |
| 2 | 1.9 | 20.9 | 18.9 | 13.9 | 129 M |
| 3 | 1.4 | 9.0 | 8.1 | 7.7 | 132 M |
| 4 | 1.3 | 11.3 | 9.8 | 8.6 | 152 M |
| 5 | 1.2 | 7.4 | 7.4 | 7.0 | 168 M |

[1]Samples same as above.

Each of the above samples were also tested for optical properties by initially injection molding circular test chips. A "see-through" test was then carried out by setting a chip of each sample in a paperholder and looking through them for background definition. The background definitions observed through all the chips were somewhat poor; however, they were substantially comparable to that observed through a comparably sized chip of unmodified homopolymer polypropylene. A chip from each sample was also employed for a "contact" clarity test. This test was carried out by placing the chips in contact with an article having printed matter and observing whether the printed matter could be seen through the chips. Surprisingly, contact clarity corresponded directly with the ethylene content of the ethylene-propylene copolymer rubber employed with sample No. 4 being the best. Sample No. 5, containing high density polyethylene, had extremely poor comparative clarity.

Various modifications of this invention can be made or followed in light of this disclosure and the discussion set forth above without departing from the spirit and scope thereof.

What is claimed is:

1. A polypropylene impact blend having high clarity and a good balance of overall mechanical properties, consisting essentially of:
   about 70 to about 95% by weight of polypropylene having a melt flow rate of from about 0.5 to about 30;
   about 1 to about 18% by weight of a low density polyethylene having a density of no more than about 0.929 g/cc and a melt index of from about 0.5 to about 50; and
   about 2 to about 24% by weight of an amorphous ethylene-propylene copolymer elastomer, with or without a non-conjugated diene, having a combined ethylene content of at least 50% by weight of said elastomer and a Mooney viscosity of from about 40 to about 120 ML 1+8' at 212° F.

2. The polypropylene impact blend of claim 1, wherein the amorphous ethylene-propylene copolymer elastomer is selected from the group consisting of an ethylene-propylene binary copolymer elastomer, an ethylene-propylene-non-conjugated diene terpolymer elastomer, having a diene content of from about 1 to about 5% by weight, and mixtures thereof, said elastomer having a combined ethylene content of from about 60 to about 80% by weight and Mooney viscosity of from about 70 to about 100 ML 1+8' at 212° F.

3. The polypropylene impact blend of claim 1, wherein the low density polyethylene has a density of from about 0.915 to about 0.924 g/cc and a melt index of about 2 to about 30.

4. The polypropylene impact blend of claim 1, wherein the polypropylene is an isotactic polypropylene of greater than 90% hot heptane insolubles having a melt flow rate of about 1.0 to about 20.

5. The polypropylene impact blend of claim 1, wherein the weight ratio of amorphous ethylene-propylene copolymer elastomer to low density polyethylene is from about 1:1 to about 2:1.

6. The polypropylene impact blend of claim 1, wherein the polypropylene is present in an amount of from about 75 to about 90% by weight, the low density polyethylene is present in an amount of from about 3 to about 10% by weight, and the amorphous ethylene-propylene copolymer elastomer is present in an amount of from about 7 to about 15% by weight.

7. The polypropylene impact blend of claim 6, wherein the polypropylene is an isotactic polypropylene of greater than 90% hot heptane insolubles having a melt flow rate of from about 1 to about 20, the low density polyethylene has a density of about 0.915 to about 0.924 g/cc and a melt index of about 2 to about 30, and the ethylene-propylene copolymer elastomer is selected from the group consisting of an ethylene-propylene binary copolymer elastomer, an ethylene-propylene-non-conjugated diene terpolymer elastomer, having an unconjugated diene content of from about 1 to about 5 wt.%, a combined ethylene content of from about 60 to about 80% by weight, based upon the weight of said elastomer and a Mooney viscosity of about 70 to about 100 ML 1+8' at 212° F.

* * * * *